SYNC SEPARATOR

Filed March 29, 1952

INVENTOR
Bethel E. Denton
BY [signature]
ATTORNEY

United States Patent Office 2,797,258

Patented June 25, 1957

2,797,258

SYNC SEPARATOR

Bethel E. Denton, Merchantville, N. J., assignor to Radio Corporation of America, a corporation of Delaware Application March 29, 1952, Serial No. 279,425

4 Claims. (Cl. 178—7.3)

This invention relates to synchronizing circuits and more particularly it relates to synchronizing pulse separating circuits of the type generally used in television receivers which are operable to vary the pulse clipping level as a function of the signal amplitude.

Two major requirements of synchronizing pulse separating circuits are noise immunity and proper separation with signals of wide varying amplitude level. The latter condition has been met by various circuits having variable thresholds of operation automatically established as a function of signal strength. Among such circuits, those operating with synchronizing pulses of a positive sense at grid input circuits to excite grid current flow for setting the threshold level have certain advantages and are desirable for strong signal conditions. When weak signals are encountered, however, the additional noise superimposed thereupon has a tendency to establish the threshold level and cause erratic operation. This could be corrected by providing a lower impedance grid input circuit to quickly dissipate noise energy. With such a circuit, however, strong signal operation is adversely affected because a large amount of the synchronizing pulse energy is needed to set up the operating threshold. The two requirements for synchronizing pulse separation therefore appear to be inconsistent for grid leak separator circuits when signals of varying strength are applied thereto.

It is therefore an object of the present invention to provide improved synchronizing separator circuits operable under weak signal and high noise conditions.

It is another object of the invention to provide synchronizing separator circuits adapted for operation with incoming signals varying throughout a wide range of signal amplitudes.

It is still another object of the invention to provide synchronizing separator circuits for positive polarity pulses having a low impedance input circuit.

It is a further object of the invention to provide synchronizing separator circuits of the grid leak variable threshold type affording improved operation in the presence of weak signals accompanied by high amplitude noise.

In accordance with the present invention there is provided a synchronizing pulse separator circuit having a low impedance grid input circuit. Synchronizing pulses of a positive polarity are applied to the low impedance grid input circuit. A clipping level dependent upon incoming signal amplitude is partially established by the grid leak circuit as positive sync tips cause grid current flow. An automatic gain control circuit is operable to aid the grid input circuit to the synchronizing pulse separator circuit in establishing the threshold level to provide operation over a large range of signal strength variation.

Further objects and advantages of the invention along with an understanding of the principles of operation thereof, will be made clear from the following description when considered in connection with the accompanying drawings, in which.

Figures 1, 2:
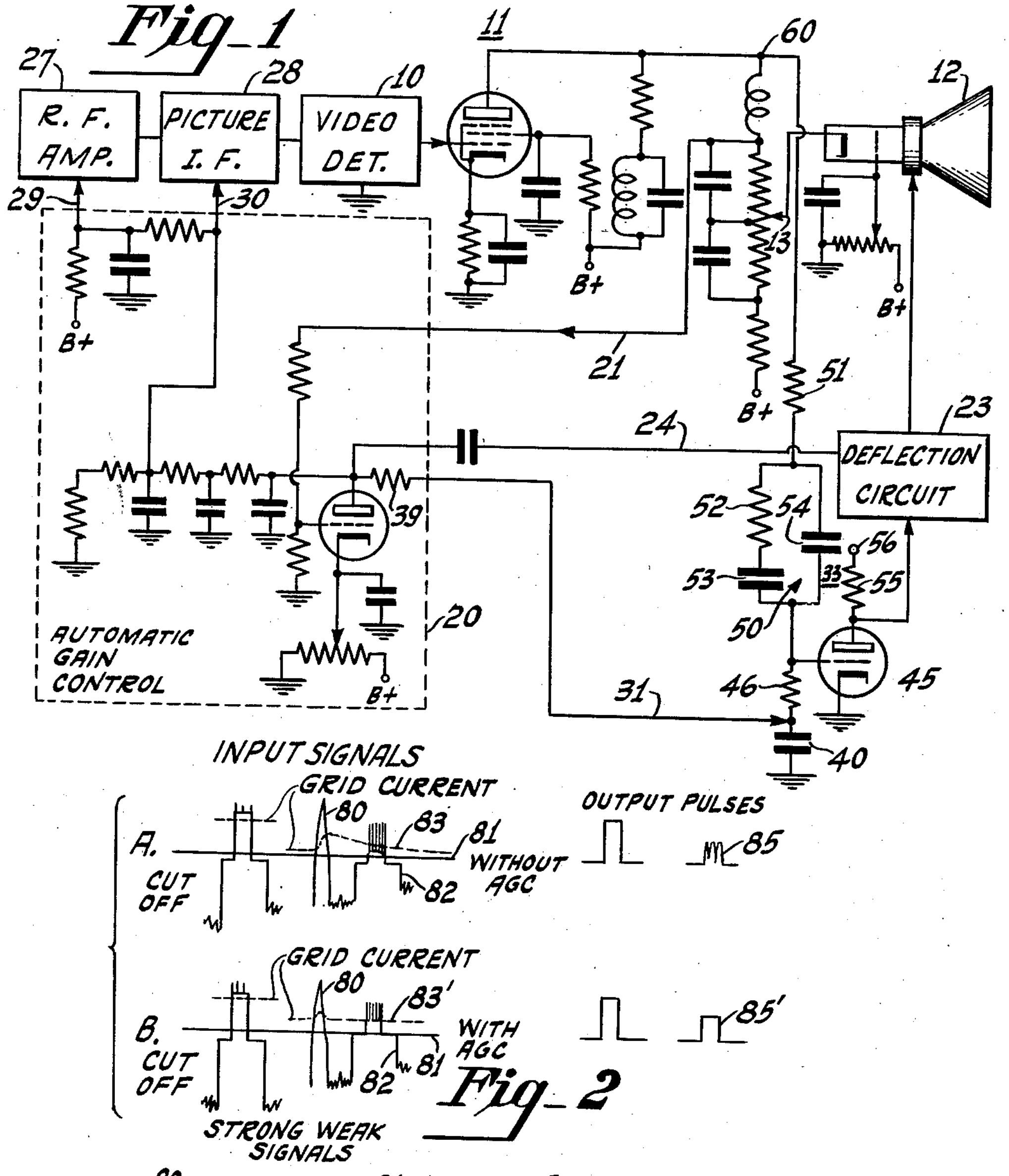
Figure 1 is a schematic circuit diagram, partially in block form, of a television receiver embodying the invention.
Figure 2 is a waveform diagram illustrating operational features of the invention; and, Figure 3 is a simplified block diagram of circuits constructed in accordance with the invention.

Referring now to the drawings and in particular to Figure 1, a television receiver diagram is shown with a video detector circuit 10 providing signals at the video amplifier circuit 11. Amplified video signals are applied to the kinescope 12 as taken from the variable contrast control tap 13. The features of construction of the video amplifier circuit are disclosed in detail and claimed in my copending application, Serial No. 218,310, filed March 30, 1951.

An automatic gain control or AGC amplifier circuit 20 is provided to esablish a control potential from video signals inserted at lead 21. This circuit is a keyed AGC circuit pulsed from signals taken from the deflection circuits 23 by way of the anode input lead 24. The principles of operation of keyed AGC circuits are well known in the art as evidenced by the article entitled "A new fast noise-immune television AGC circuit" by K. R. Wendt, published in the RCA Review for September 1948, and therefore need not be discussed in detail. Suitable potentials are provided by this circuit for biasing the radio frequency and intermediate frequency amplifier circuits 27 and 28 of the receiver at output leads 29 and 30, respectively. An additional AGC output lead 31 is provided in accordance with the present invention for aid in establishing the automatically variable separation threshold of the synchronizing pulse separator circuit 33.

In the additional output from the AGC circuit, separate filtering is afforded by resistor 39 and capacitor 40 to provide a direct current control potential from the pulses on the anode of the AGC amplifier tube. In this manner the usual operation of the radio frequency and intermediate frequency circuits is not disturbed by variations of current flow in the sync separator tube 45.

The grid input impedance devices across which the signal is developed comprise the series resistor and capacitor 46, 40. The resistor may be made as small as 400,000 ohms (or even smaller) while providing the desired automatically variable threshold because of the contribution of control potential by the AGC circuit, as contrasted with about 1.5 megohms necessary when the grid leak bias alone establishes the clipping threshold level. This is highly desirable because the grid current flow due to the noise impulses with weak signals may be readily dissipated without unduly disturbing sync separation. Conversely, with strong signals enough aid is given by the AGC potential to prevent the sync pulses from becoming consumed in sustaining the necessary grid current flow to maintain the threshold level, as would otherwise be inherent with a low input circuit impedance. Improved sync separation is therefore afforded by the present invention by addition of only an inexpensive filter network in the AGC circuit consisting of resistor 39 and capacitor 40.

The impedance network 50 is provided to peak the response at the grid of the separator tube 45 at synchronizing pulse frequencies to thereby increase the separator efficiency. This expedient is well known in the art.

It has been found that one circuit constructed and operated in accordance with the teachings of the invention had the following circuit parameters:

| | |
|---|---|
| C40 | .1 mfd. |
| C53 | .033 mfd. |
| C54 | 220 mmf. |
| R51 | 12 k ohms. |
| R52 | 47 k ohms. |
| R55 | 6800 ohms. |
| R46 | 390 k ohms. |
| Tube 45 | ½ (12AT7). |
| Video potential at terminal 60 | Approx. 120 v. max. |
| AGC potential at lead 31: | |
| Max signal | Approx. 50 v. |
| Min. signal | 0 v. |
| B+ potential at terminal 56 | 80 v. |

Typical waveforms illustrating operation of the synchronizing pulse separator circuit of the invention under variable signal conditions are shown in Figure 2. Figure 2A illustrates operation with both strong and weak signal conditions in a circuit operating with only grid leak automatic threshold determining means. It is noted that in this case a strong noise pulse 80 will cause a large flow of grid current thereby increasing the bias in the grid circuit and pushing the dotted line representing the signal strength necessary to cause grid current flow upward. At the same time when taking an arbitrarily fixed straight line 81 for the cut-off reference position, the weak signal synchronizing waveform 82 is relatively moved with the sync tips near cutoff. This results because the necessary high grid impedance allows the bias to dissipate slowly in the manner shown by the difference between the dotted line 83 and the straight line 81. As a consequence the noise impulses arriving on the peaks of sync during weak signal conditions will cause an irregularly shaped output synchronizing pulse 85.

With a lower impedance grid circuit the grid current level variation 83 remains essentially at a constant level when the large noise wave 80 arrives, both because the grid current flow generates less voltage and because the lower impedance circuit allows recovery in a much shorter time. The automatic threshold level thereby is not substantially affected by noise and the synchronizing waveform 82 has sync tips extending well above cutoff. Such action results in a cleanly separated sync output pulse 85' in the presence of noise or weak signal conditions.

Figure 3:
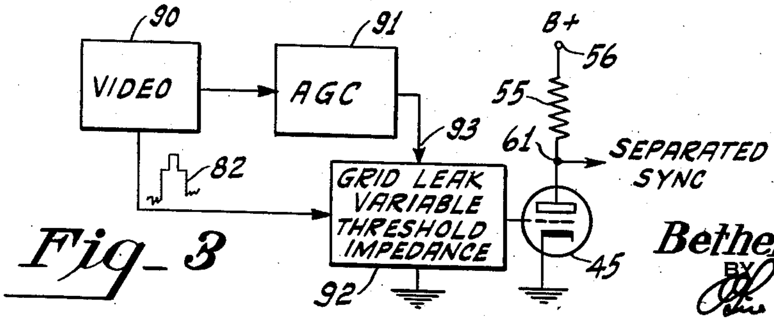

A block diagram of the circuit combination effective to provide these improved results is shown in Figure 3. This diagram is essentially a simplified form of the invention schematically shown in Figure 1 and comprises a video circuit 90 providing signals for operation of the separator tube 45 and automatic gain control circuit 91. A suitable variable threshold grid leak impedance circuit 92 is provided to assure that the synchronizing pulses are cleanly separated by the clipping operation of tube 45. This primarily is a result of grid current flow at the tips of the positive sync pulses of the incoming video signal 82.

To aid the operation of the variable threshold circuit and thereby extend the operation over a greater range of signal strength the AGC circuit 91 supplies to terminal 93, located at a desirable position in the grid leak impedance circuit 92, a further control potential in the manner more fully described hereinbefore.

Accordingly, improved sync separation is separator circuits having variable threshold operation established from grid current flow excited by the tips of positive sync pulses is provided in accordance with the invention by the provision of a low impedance grid circuit and separate automatic gain control means coupled thereto for aiding the grid current in establishing the variable threshold level dependent upon signal strength.

Having thus described the construction and operation of the invention, those features believed descriptive of its nature are defined with particularity in the appended claims.

What is claimed is:

1. A circuit for improving synchronizing pulse separator operation in the presence of noise comprising in combination, a signal source having one output terminal providing synchronizing pulses of positive sense, automatic gain control means coupled to said signal source to provide a control potential of an amplitude dependent upon signal strength, said automatic gain control means having a relatively slow time constant response characteristic a sync separator circuit having an amplifier tube with a grid input circuit coupled to said signal source output terminal, grid leak biasing means having a relatively fast time constant coupled in said grid input circuit operable upon grid current flow at the tips of said synchronizing pulses to establish a bias in such direction to provide a variable threshold for said synchronizing pulses, and a circuit connecting said automatic gain control means to said grid leak biasing means in such polarity to aid the variable threshold action whereby noise immunity in presence of weak signals is attained and improved synchronizing pulse separation is provided over a large range of signal strength variation.

2. A synchronizing pulse separator circuit comprising in combination, means supplying periodically recurrent synchronizing pulses in positive sense, a synchronizing pulse amplifier tube having a low impedance grid input circuit coupled to said means, relatively fast time constant grid leak bias means in said input circuit operable to establish a variable clipping threshold from grid current flow, the value of said grid leak time constant being in the order of the periodicity of said synchronizing pulses, and a long time constant automatic gain control circuit operable to provide a potential representative of signal strength connected to said input circuit, the value of said automatic gain control circuit time constant being substantially longer than the time constant of said grid leak bias means, whereby substantially constant separated synchronizing pulses are provided with said low impedance grid circuit over a large range of signal strength variation.

3. In a television receiver, a synchronizing signal separator circuit for separating the synchronizing signal component from a composite television signal borne by a received radio carrier, said composite signal comprising a video component, a periodically recurrent blanking pulse component and a periodically recurrent synchronizing pulse component, said synchronizing pulse component being substantially superimposed on top of said blanking component with said video component falling between successive blanking components, said video component having maximum excursions which are restricted to fall generally below the peak amplitude of said blanking component, the combination of: means for receiving television radio carrier signals of the type described; means operatively included in said receiver for developing an automatic gain control potential representing the strength of received radio carrier signals, said automatic gain control potential developing means including time constant means restricting the response of automatic gain control potential to a value below a predetermined magnitude; a signal amplifier means operatively connected in said receiver for amplifying received signal information; direct current connections from said gain control potential developing means to said amplifier means for operatively controlling the gain of said amplifier means as an inverse function of received signal strength; signal detector means operatively coupled with said amplifier means to produce a demodulated video signal; a synchronizing signal separator circuit comprising a vacuum tube having at least a control grid, cathode and anode; impedance means including a resistor connected between said control electrode and cathode to define at least in part an input circuit for said tube; an anode output load circuit including an anode polarizing potential supply, connected between said anode and cathode; coupling means including a capacitor capacitively coupling said detector means with said vacuum tube input circuit, said coupling means being electrically constituted to drive said input circuit into grid-cathode current conduction in response to peaks of demodulated video signal which cause said grid to become positive with respect to said cathode, said grid-cathode conduction developing a primary negative grid to cathode bias potential on said tube, the effective value of said capacitive coupling means and said input circuit resistor being such to define a time constant of shorter duration than the time constant of said automatic gain control potential developing means; and direct current transducing means operatively connected from said automatic gain control potential developing means to said vacuum tube input circuit to apply thereto a secondary bias, the value of which tends to increase the negative grid-cathode bias on said tube in response to an increase in received signal strength, the combined primary and secondary biases being so proportioned to permit conduction in said tube only for signal excursions extending beyond said maximum excursions in said video signal, whereby signals are caused to appear in said output circuit which represent the separation of said synchronizing pulses from said video signal component over a wide range of received signal strengths.

4. In a television receiver, a synchronizing signal separator circuit for separating the synchronizing signal component from a composite television signal borne by a received radio carrier, said composite signal comprising a video component, a periodically recurrent blanking pulse component and a periodically recurrent synchronizing pulse component, said synchronizing pulse component being substantially superimposed on top of said blanking component with said video component falling between successive blanking components, said video component having maximum excursions which are restricted to fall generally below the peak amplitude of said blanking component, the combination of: means for receiving television radio carrier signals of the type described; means operatively included in said receiver for developing an automatic gain control potential representing the strength of received radio carrier signals, said automatic gain control potential developing means including time constant means restricting the response of automatic gain control potential to a value below a predetermined magnitude; a signal amplifier means operatively connected in said receiver for amplifying received signal information; direct current connections from said gain control potential developing means to said amplifier means for operatively controlling the gain of said amplifier means as an inverse function of received signal strength; signal detector means operatively coupled with said amplifier means to produce a demodulated video signal; a synchronizing signal separator circuit comprising an amplifier device having input terminals and output terminals, said input terminals expressing a relatively low impedance unilateral conduction for applied signal excursions exceeding a given maximum amplitude in a given polarity direction and bidirectional conduction of relatively high impedance for signal excursions of an amplitude below said given maximum amplitude, said amplifier device being subject to cutoff by sufficient bias potential applied to said input terminals in a direction opposite to that of said given polarity direction; capacitance means operatively applying demodulated video signal to said input circuit with such polarity and amplitude that said synchronizing pulse component produces said unilateral input circuit current flow, said capacitance means being so valued relative to said bidirectional impedance as to form a time constant shorter than the time constant value of said automatic gain control potential developing means, and to produce a primary bias of a polarity tending to effect cutoff of said amplifier; and direct current transducing means operatively connected from said automatic gain control potential developing means to said input terminals to apply thereto a secondary bias also with a polarity tending to produce cutoff in said amplifier, the combined biasing influence of said primary and secondary biases being such to maintain substantially constant the percentage of synchronizing signal component amplified by said amplifier device regardless of a given range of change in the strength of received signals and amplitude of said video component.

References Cited in the file of this patent

UNITED STATES PATENTS

| | | |
|---|---|---|
| 2,021,321 | Miller | Nov. 19, 1935 |
| 2,076,814 | Franks | Apr. 13, 1937 |
| 2,086,465 | Brown | July 5, 1937 |
| 2,223,995 | Kotowski et al. | Dec. 3, 1940 |
| 2,538,772 | Ferrill | Jan. 23, 1951 |
| 2,572,235 | Young | Oct. 23, 1951 |
| 2,594,916 | Gulnac | Apr. 29, 1952 |
| 2,621,290 | Andresen | Dec. 9, 1952 |
| 2,652,450 | Tourshou | Sept. 15, 1953 |

OTHER REFERENCES

Radio Amateur's Handbook, page 167, 1946 edition. (Copy in Div. 51.)